A. THOUSAND.
AUTOGENOUS WELDING OUTFIT.
APPLICATION FILED DEC. 12, 1913.

1,094,761.

Patented Apr. 28, 1914.

WITNESSES:—
R. G. Allen
F. E. Aul

INVENTOR
Adolph Thousand,
By Owen, Owen & Crampton,
His attys.

UNITED STATES PATENT OFFICE.

ADOLPH THOUSAND, OF WESTON, OHIO.

AUTOGENOUS WELDING OUTFIT.

1,094,761.   Specification of Letters Patent.   Patented Apr. 28, 1914.

Application filed December 12, 1913.   Serial No. 806,313.

*To all whom it may concern:*

Be it known that I, ADOLPH THOUSAND, a citizen of the United States, and a resident of Weston, in the county of Wood and State of Ohio, have invented a certain new and useful Autogenous Welding Outfit; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

This invention relates particularly to autogenous welding plants or outfits, but is not restricted to such use as it may be used in any connection for which it may be adapted or appropriate.

The primary object of my invention is the provision of means in connection with outfits of this character, which is operable upon the application of weight, such for instance, as the weight of the associated burner, to a part thereof to automatically close the fluid supply line or lines to the burner when the burner is not in use, whereby to effect a material saving of oxygen and acetylene or other gas used.

The invention is fully described in the following specification, and while, in its broader aspect, it is capable of embodiment in numerous forms, a preferred embodiment thereof is illustrated in the accompanying drawings, in which,—

Figure 1:
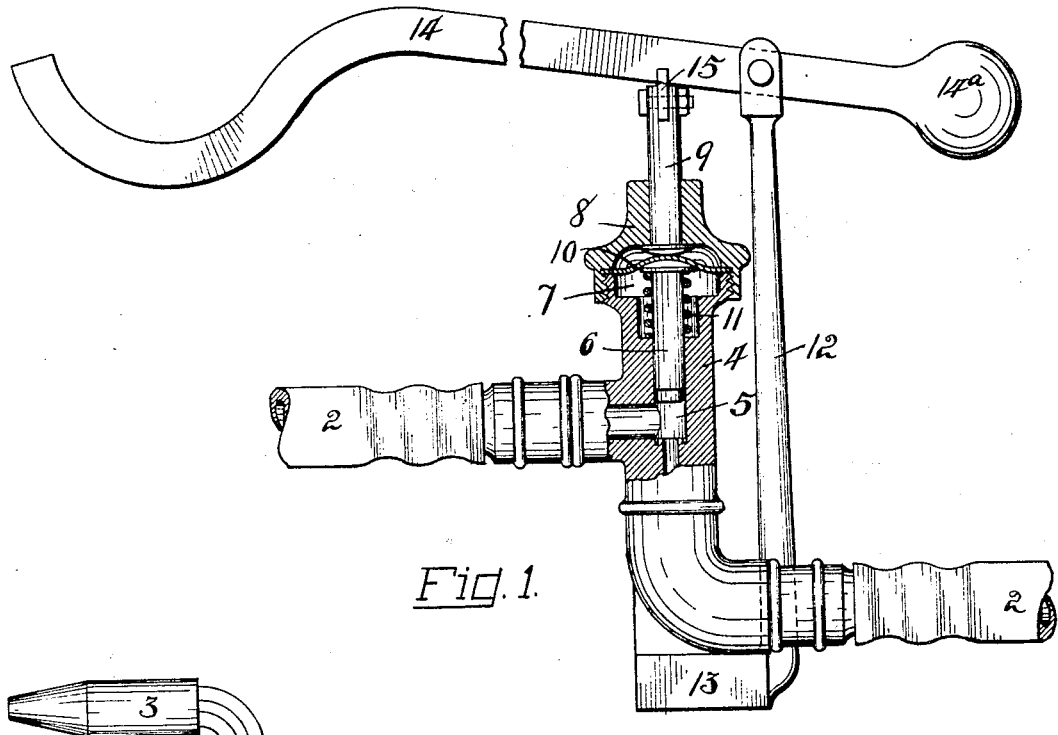
Figure 2:
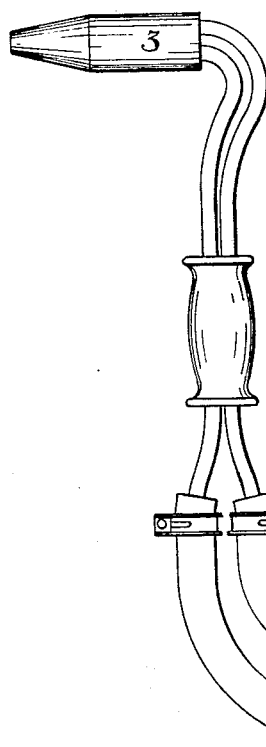

Figure 1 is a side elevation of the device embodying my invention with a part in section, and Fig. 2 is a reduced plan view thereof with a burner in connection therewith.

In the drawings, 1 and 2 designate fluid supply lines having connection with an acetylene or other form of burner 3, one of which lines may be for oxygen and the other for acetylene gas. Each of these lines has a part 4 interposed therein and forming a valve casing, the valve chamber 5 of which intersects the line passage. The valve casing parts 4 are preferably arranged in adjacent relation and each has a valve member 6 mounted for reciprocatory movements in the chamber 5 thereof. The valve 6, in the present instance, when lowered seats over and closes the inlet end of the line passage to the chamber 5 and has its upper end extended into an enlarged portion 7 of the valve chamber, which enlargement is closed at its outer end by a screw cap 8 having an axially disposed opening through which a plunger 9 projects for reciprocatory movements relative to the cap.

A diaphragm 10 is gripped between the outer end of each part 4 and its cap and extends loosely across the enlarged chamber portion 7 to provide a fluid tight closure between such chamber and the cap 8, whereby to obviate the use of the stuffing box in the cap through which the plunger 9 may work. A coiled compression spring 11 encircles the valve 6 within the chamber enlargement 7 and has its lower end thrust against the bottom portion of such enlargement and its upper end thrust against a flange or headed portion of the valve, thus serving to yieldingly maintain the valve 6 in raised or open position, as shown in Fig. 1. The upward movement of the valve 6 under the influence of the spring 11 is against the diaphragm 10 and is opposed by the lower end of the plunger 9 on the opposite side of such diaphragm. The central portion of the diaphragm 10 has sufficient play axially of the chamber 7 to permit a lowering movement of the plunger to force the associated valve 6 into closed position.

A standard 12 rises, in the present instance, from a base member 13 on which the parts 4, 4 are shown as being mounted, and is disposed intermediate said parts at one side thereof. A lever 14 is fulcrumed to the upper end of the standard 12 and extends therefrom over and rests upon a link or cross-bar 15, which connects the upper ends of the two plungers 9, 9. The free end portion of the lever 14 is of hook shape, as shown, to enable the burner 3 or other object to be hung thereon. The weight of such object is supposed to be sufficient to overcome the pressure of the spring 11 on the valves 6 and plungers 9 so that the hanging of the object on the lever will effect a simultaneous automatic closing of the valves 6. The lever raising action of the spring 11 may also be augmented by weighting an end portion thereof, as at 14$^a$.

In the use of my invention the operator whenever he is through using the burner hangs the same on the hook or lever 14, thus effecting a simultaneous lowering of the valves 6, 6, and a consequent closing of the supply lines leading to the burner, thereby saving the gas which would otherwise be burned if the burner was set down in a lighted state when not being used.

Having thus described my invention, what I claim as new, and desire to secure by Letters Patent, is,—

1. In a fluid pressure line, a reciprocatory valve for closing the same, means separate from the fluid line pressure for causing said valve to normally stand in open position, a plunger movable to impart closing movements to the valve, a movable diaphragm interposed between said valve and plunger, and an article-supporting lever having connection with said plunger and operable by the weight of an article hung thereon to move the plunger and valve to closed position.

2. In combination, a plurality of fluid supply lines each having a valve chamber therein, a valve movable in each of said chambers to close the respective lines, means urging the valves to have opening movements, an article-supporting lever fulcrumed adjacent to said valves, and means connecting said lever and valves and operable by a movement of said lever upon the application of weight on a part thereof to effect a simultaneous closing of the valves.

3. In combination, a plurality of fluid supply lines each having a valve chamber therein, a valve movable in each of said chambers to close the respective line, means urging each valve to open position, a plunger entering each chamber from without the same and movable to impart closing movements to the associated valve, a movable diaphragm interposed between the valve and plunger of each set, a bar connecting the outer ends of the several plungers, and an article supporting lever having engagement with said bar and operable by the weight of an article hanging thereon to move the bar and plungers to valve closing position.

In testimony whereof, I have hereunto signed my name to this specification in the presence of two subscribing witnesses

ADOLPH THOUSAND.

Witnesses:
JAY A. WALTZ,
CHAS. ROE.